(No Model.)
J. W. DOWNS.
CULTIVATOR.
No. 448,323.  Patented Mar. 17, 1891.
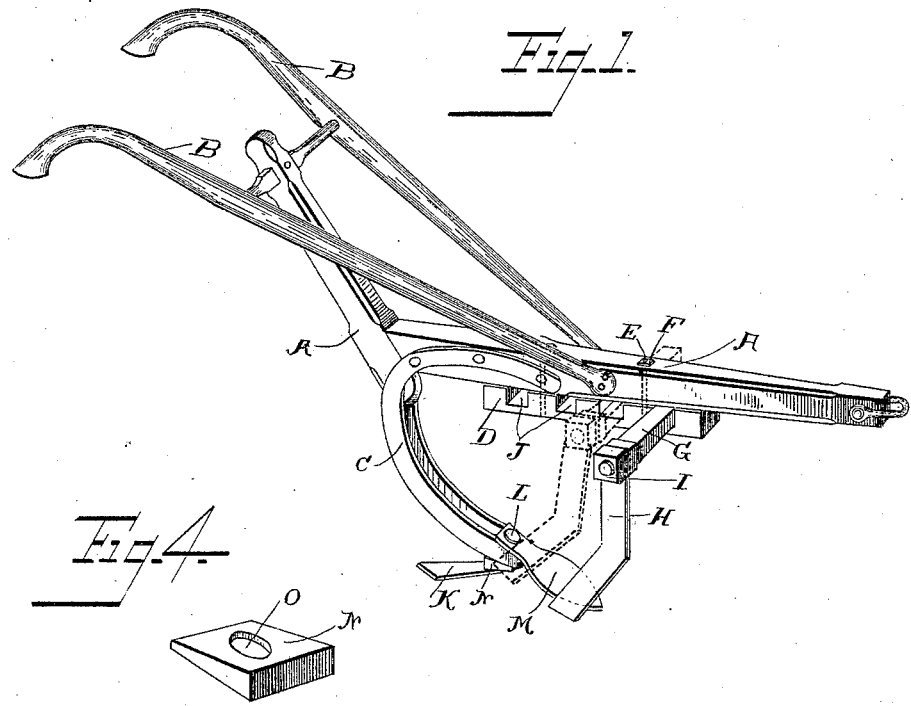
Fig. 1.
Fig. 4.
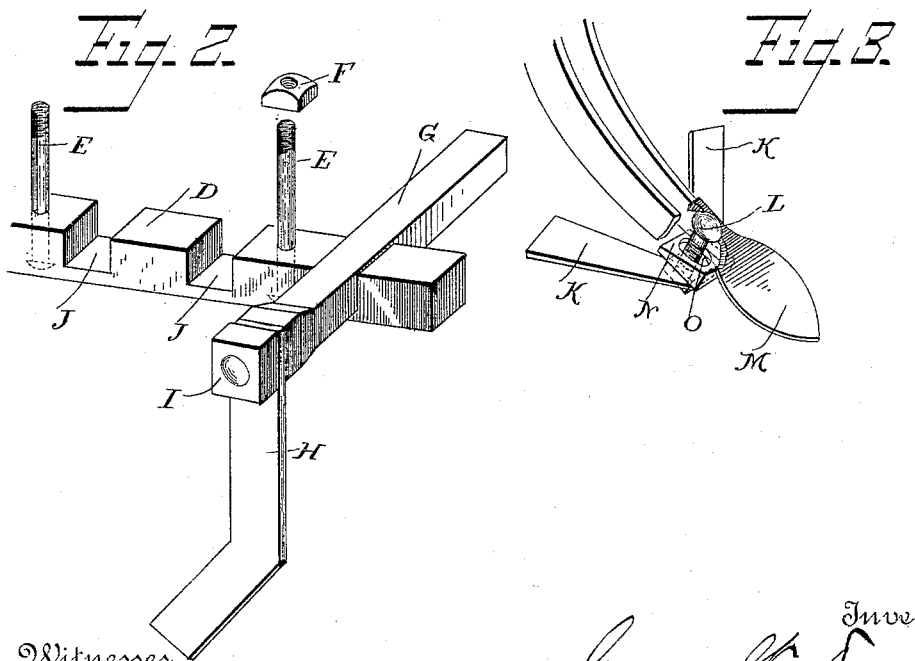
Fig. 2.
Fig. 3.
Witnesses
C. E. Hunt.
Alfred T. Gage.
Inventor
James W. Downs
by Wm. D. Henderson
his Attorney

UNITED STATES PATENT OFFICE.

JAMES W. DOWNS, OF BOWDON, GEORGIA.

CULTIVATOR.

SPECIFICATION forming part of Letters Patent No. 448,323, dated March 17, 1891.

Application filed September 20, 1890. Serial No. 365,665. (No model.)

*To all whom it may concern:*

Be it known that I, JAMES W. DOWNS, a citizen of the United States, residing at Bowdon, in the county of Carroll and State of Georgia, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to cultivators, and is particularly well adapted to cotton-scrapers or cultivators for other small plants.

Its object is to provide a guard or fender that will prevent trash, stones, and other comparatively large and heavy bodies from falling over onto the plants being cultivated, and will direct them to one side away from the plant and cause the upturned soil to fall at the point desired.

It also has for its object to provide for raising or lowering the scrapers, so as to throw, as desired, more or less of the upturned light soil around the plant as the condition of the plant may require, thus saving much labor otherwise required to properly cultivate the plants.

To the accomplishment of the foregoing objects and such other desirable results as may hereinafter appear, the invention consists in the construction and combination of parts herein particularly described, and afterward defined by the claims, reference being had to the accompanying drawings, forming a part hereof, and in which—

Figure 1 is a perspective of a cultivator with the fender and the scrape-adjuster applied thereto. Fig. 2 is a perspective of the fender, its bar and clamp detached and on an enlarged scale. Fig. 3 is a perspective of the lower portion of the standard with a part of the plow-foot and standard broken away to show the position of the adjusting wedge-block. Fig. 4 is a perspective of the adjusting wedge-block.

In the drawings, the letter A designates the cultivator-beam, B the handles, and C the standard, the latter embracing both sides of the beam.

To the under side of the beam there is secured a clamping-bar D, which is held to the beam by suitable means—for instance, by bolts E, passed up through the bar and the beam and having nuts F applied to their upper threaded ends, so as to tighten or loosen the grip of the clamping bar or jaw on the rod or bar G, which carries the fender H at its end, the fender fitting over the end of its bar and held in place and to any adjustment desired by a nut I, screwed onto the end of the bar G. The fender-bar fits into any one of a series of notches or recesses J, formed in the top of the bar G, and its top face bears against the under side of the beam, so that when the clamping bar or jaw is drawn up it will securely clamp the fender-bar to its place. This fender is thus supported laterally from the side of the beam and can be adjusted to and from the beam by simply loosening and tightening the clamping-bar, and in that way the fender can be adjusted to suit various conditions and any-sized scrape or plow that it may be desired to use. The fender can also be adjusted backward and forward along the beam by merely shifting it from one notch to another, so as to carry it nearer to or farther from the scrapers, as desired. I have in Fig. 1 shown the fender in one position by full lines, and in dotted lines have shown it in another position. It will also be observed that the fender can be raised or lowered by loosening the nut I and simply turning the fender and again tightening the nut. I have shown the fender by dotted lines as in a higher position than in full lines. It is apparent that it can be adjusted to any other desired height. If there is a hard crust to the soil, the fender can be turned down to the position shown in full lines, so as to cut one-half inch, more or less, as desired, into the soil, and thus loosen the ground, so that hard pieces of the crust will not be thrown onto the plants.

The scrapers K are held to the standard C by the bolt L, which also holds the plow foot or point M to its place.

Between the under side of the standard and the scrapers K, I insert a beveled or wedge-shaped block N, by which the scrapers can be raised and lowered to throw more or less dirt, as desired or necessary. If the block be set with its thin edge up and the nut on the bolt L be screwed up to bring the scrapers square against the under side of the block, the scrapers will be raised so as to throw the most dirt. On the other hand, if it is desired to throw the smallest amount of dirt the parts will be loosened and the thick edge of the block put uppermost, when the scrapers will be held down in a lower position and consequently they will throw less dirt. The scrapers can be adjusted to various heights between the two extremes by simply slipping the block up or down, it being formed with an elongated slot O to permit it to be so moved. The scrapers, the wedge, and the plow point or foot are all securely held to their place by tightening the nut on the bolt L.

By the construction of the parts as described the dirt can be thrown around the plants—for instance, the cotton plant, or other plant, even though it be only three inches high—and as the rocks, trash, and other heavy bodies are thrown into the furrow only the lightest soil is thrown onto the plants, and consequently they are not knocked down and covered up, but allowed to stand upright with the soil thrown lightly around them. The parts also admit of the greatest latitude in adjustment, so that the soil can be thrown to suit any conditions.

Another advantage is that the attachments can be applied to any cultivator already in use, thereby saving great expense and placing the attachment within reach of all farmers, as there has not to be a special construction of plow to permit the use of the attachments.

I have described with particularity the details of construction of the several parts as they are believed to be simple and as efficient as any construction; but I do not mean to be restricted thereto, as many changes may be made without departing from my invention.

Having described my invention and set forth its merits, what I claim is—

1. In a cultivator, the combination, with the beam and standard, of a clamping-bar applied to the beam and formed with a recess to receive a laterally-adjustable bar and securing the latter to the beam, the laterally-adjustable bar fitting in the recess of the clamping-bar and having a portion thereof bearing against the beam, and a fender rotatable upon the end of said laterally-adjustable bar, but normally held in a fixed adjusted position, substantially as and for the purposes set forth.

2. In a cultivator, the combination, with the beam and standard, of a clamping-bar applied to the beam and formed with a series of recesses to receive a laterally-adjustable bar at any one of a series of positions and securing the latter to the beam, the laterally-adjustable bar to fit in the recesses of the clamping-bar, and the fender depending from the end of said laterally-adjustable bar, substantially as and for the purposes set forth.

In testimony whereof I affix my signature in presence of two witnesses.

JAMES W. DOWNS.

Witnesses:
H. M. WILLIAMS,
J. W. JONES.